United States Patent [19]

Adkins et al.

[11] Patent Number: 5,012,174

[45] Date of Patent: Apr. 30, 1991

[54] METHOD AND APPARATUS FOR COUNTERING VIBRATIONS OF A PLATFORM

[75] Inventors: Charles M. Adkins; James R. Brazell; Gerard T. Mayer; Henry C. Stacey, all of Charlottesville, Va.

[73] Assignee: Sperry Marine Inc., Charlottesville, Va.

[21] Appl. No.: 209,251

[22] Filed: Jun. 20, 1988

[51] Int. Cl.$^5$ .......................................... B64C 17/06
[52] U.S. Cl. .................................... 318/649; 318/648; 318/611; 318/631; 356/350; 73/505
[58] Field of Search ............... 318/569, 577, 594, 601, 318/608, 640, 648, 649; 310/322–332; 356/350; 73/505, 510; 33/291, 299, DIG. 8, DIG. 21; 248/550, 559

[56] References Cited

U.S. PATENT DOCUMENTS

| | | | |
|---|---|---|---|
| 3,395,270 | 7/1968 | Speller | 318/649 X |
| 3,398,341 | 8/1968 | Dooley et al. | 318/649 |
| 3,824,438 | 7/1974 | Wiebe | 318/631 |
| 3,854,378 | 12/1974 | Vogel | 318/649 X |
| 3,936,716 | 2/1976 | Bos | 318/591 |
| 3,986,092 | 10/1976 | Tijsma et al. | 318/649 |
| 4,096,427 | 6/1978 | Rosen et al. | 318/648 |
| 4,099,876 | 7/1978 | Dorsman | 356/350 |
| 4,113,387 | 9/1978 | Shutt | 310/332 X |
| 4,139,806 | 2/1979 | Kanber et al. | 310/322 X |
| 4,370,583 | 1/1983 | Ljung | 356/350 X |
| 4,384,409 | 5/1983 | Lao | 73/505 X |
| 4,386,853 | 6/1983 | Ljung | 356/350 |
| 4,406,965 | 9/1983 | Ljung | 310/319 |
| 4,410,951 | 10/1983 | Nakamura et al. | 318/567 X |
| 4,418,306 | 11/1983 | Samsel | 318/648 |
| 4,445,779 | 5/1984 | Johnson | 318/631 X |
| 4,483,425 | 11/1984 | Newman | 318/649 X |
| 4,498,038 | 2/1985 | Malueg | 318/648 |
| 4,525,659 | 6/1985 | Imahashi et al. | 318/649 |
| 4,533,250 | 8/1985 | Callaghan et al. | 356/350 |
| 4,601,206 | 7/1986 | Watson | 73/510 X |
| 4,610,543 | 9/1986 | Ferriss | 356/350 |
| 4,645,994 | 2/1987 | Giancola et al. | 318/648 X |
| 4,653,919 | 3/1987 | Stjern et al. | 356/350 |
| 4,655,081 | 4/1987 | Burdess | 73/505 |
| 4,727,276 | 2/1988 | Izukawa et al. | 310/328 X |
| 4,755,051 | 7/1988 | Cahill et al. | 356/350 X |
| 4,790,658 | 12/1988 | Sewell | 356/350 |
| 4,791,815 | 12/1988 | Yamaguchi et al. | 73/505 |
| 4,802,766 | 2/1989 | Lundeen et al. | 356/350 |
| 4,815,851 | 3/1989 | Soohoo | 356/350 |

Primary Examiner—Paul Ip
Attorney, Agent, or Firm—Seymour Levine

[57] ABSTRACT

A dynamic vibration absorber for reducing vibrations of a platform induced by an oscillating mass mounted thereon is provided by mounting a mass of equal mechanical resonant frequency as that of the oscillating mass and oscillating this mass in a manner to establish an equal and opposite vibration of the platform, thereby cancelling the vibrations induced by the oscillating mass. In one embodiment, a signal from the oscillating mass representative of the frequency and amplitude of its mechanical oscillation is phase shifted and utilized as a driving signal to the drive motor of the absorber mass. In another embodiment, electrical signals representative of the platform vibrations are detected to provide phase and amplitude vibration error signals. These error signals are applied to a reference signal coupled to the drive motor of the canceller mass causing the oscillations of the canceller mass to induce vibrations in the platform which counter the vibrations induced by the oscillating mass.

8 Claims, 3 Drawing Sheets

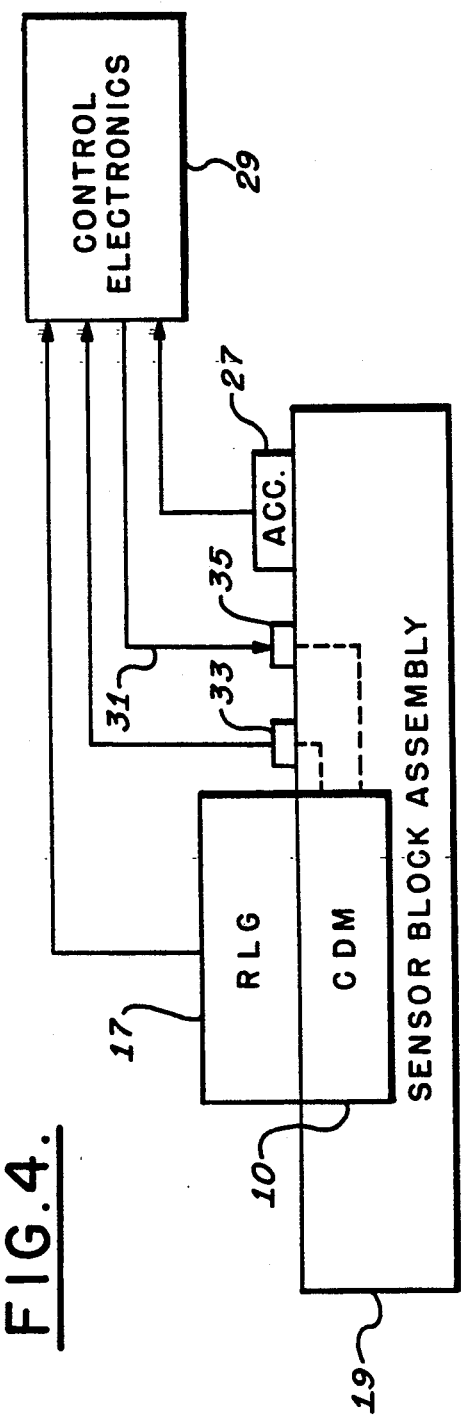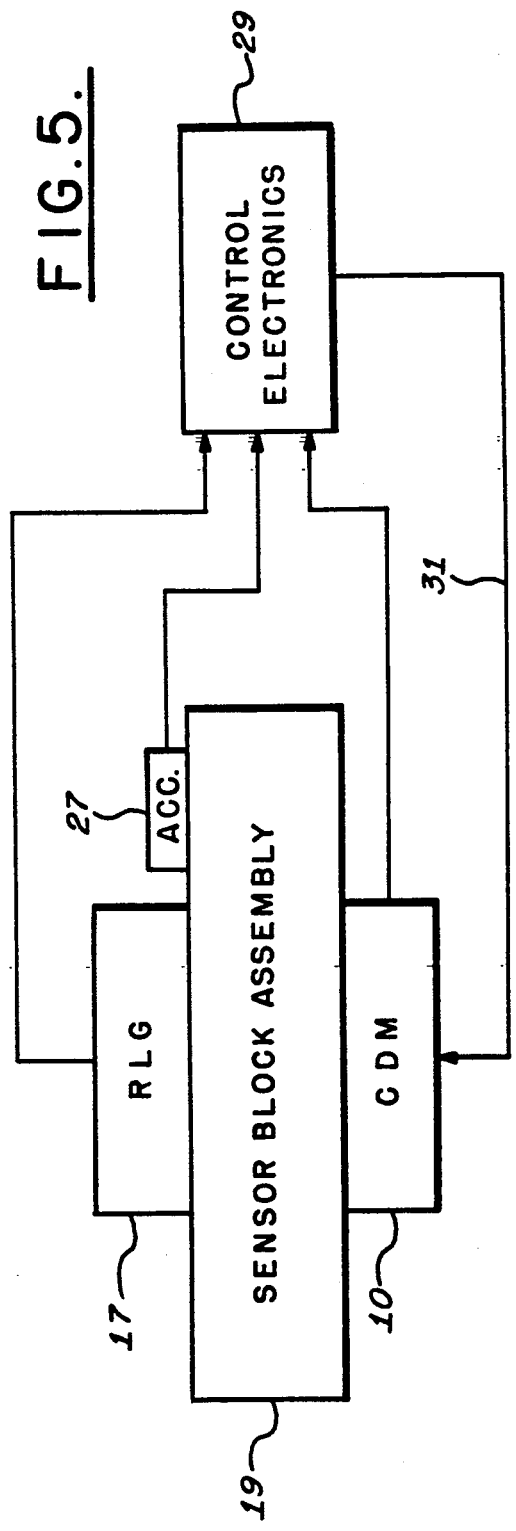

METHOD AND APPARATUS FOR COUNTERING VIBRATIONS OF A PLATFORM

BACKGROUND OF THE INVENTION

1. Field of the Invention

The invention relates to the field of dithered ring laser gyroscopes, and more particularly to apparatus for reducing the vibrations of the mounting plate induced by dithering the ring laser gyroscope.

2. Description of the Prior Art

A ring laser gyroscope utilizes two monochromatic laser beams propagating in opposite directions in a closed loop around an axis about which motion is to be sensed. Rotation of the apparatus about this axis effectively increases the beam path length in one direction and decreases the beam path length in the opposite direction. Since the laser frequencies of the two counter-rotating beams are functions of the lasing path, the differential path length established by the rotation of the ring laser gyros establishes a frequency difference between these beams. The magnitude and sign of this frequency difference are representative of the rate and direction of rotation about the sensing axis and may be monitored for that purpose in manners well known in the art. At low rotational rates, the difference in frequency between the two counter-rotating beams is small and the beams tend to resonate together or "lock-in" to oscillate at the same frequency. This lock-in prevents the ring laser gyroscope from sensing rotational rates that are at or below the lock-in rotational rate. To reduce the lock-in rate, the ring laser gyroscope is dithered, mechanically oscillated about the axis to establish rotation in one direction and then in the other, to provide motion cancellation at the output terminals while maintaining an apparent rotation in each direction, thus reducing the lock-in rate.

This dithering causes the ring laser gyroscope mounts to vibrate thereby, acting as a noise generator which adversely affects other equipment. Though well known techniques for vibration, damping, and isolation reduce the dither generated vibrations, the degree of vibration reduction is insufficient to prevent an adverse affect upon other equipment vibration coupled to the ring laser gyro mounting plate.

SUMMARY OF THE INVENTION

In accordance with the principles of the present invention, a dither vibration canceller for a dithered ring laser gyroscope (RLG) includes a mass, configure to have a mechanical resonant frequency equal to that of the RLG, coupled to the RLG and the sensor block assembly (SBA) on which the RLG is mounted. One embodiment of the invention utilizes a drive signal 180 degrees out-of-phase with the RLG dither drive signal to drive a dither motor which dithers the mass. This out-of-phase dithering of the mass induces vibrations of the SBA which counter those induced by dithering the RLG.

Another embodiment utilizes an electrical signal representative of the torque applied to the SBA by the RLG dithering drive to drive a dither motor which dithers the mass in response to the electrical signal This electrical signal—dither motor combination causes the mass to be driven in a manner that establishes a torque on the SBA that is of equal amplitude and opposite phase to the torque applied to the SBA by the dithering of the RLG. Applying torques to the SBA that are of equal amplitude and opposite phase generate vibrations in an opposing relationship which tend to cancel, thereby greatly reducing vibrations of the SBA caused by the dithered RLG.

BRIEF DESCRIPTION OF THE DRAWINGS

FIGS. 4 and 5 are block diagrams of embodiments of the invention illustrating alternate arrangements of the gyroscope, counter dither mass, and sensor block assembly.

DESCRIPTION OF THE PREFERRED EMBODIMENTS

Figure 1:
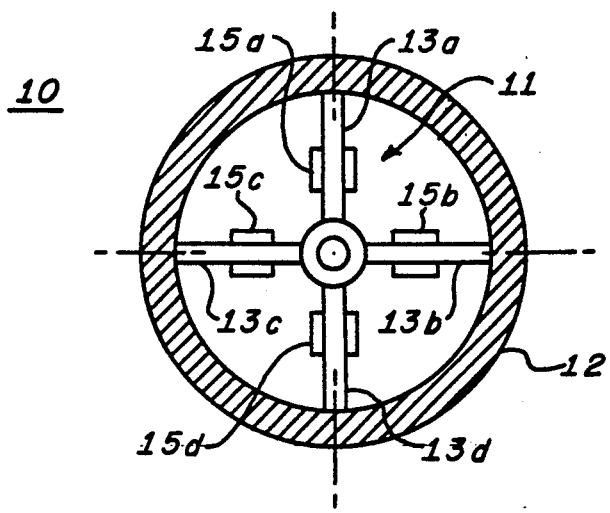
FIG. 1 is an illustration of a counter dither mass and dither motor assembly.

A ring laser gyroscope is dithered about its axis to minimize the lock-in effect of the two counter-rotating beams at low rotational rates. This dithering is a rotational oscillation about the gyroscope's axis at a constant frequency. Such dithering causes a reaction torque at the mounting points of the gyroscope to the SBA, inducing vibrations that generate noise which propagates through and radiates from the structure. In accordance with the invention, this noise may be minimized by coupling a counter dither mass (CDM) having a mechanical resonant frequency equal to that of the gyroscope to the SBA and dithering it at the same frequency and amplitude as that applied to the RLG. A dither motor mass assembly 10 that may be utilized is illustrated in FIG. 1. A dither motor 11 may be internally coupled to an angular mass 12 to provide a resonant structure having a mechanical resonant frequency equal to that of the RLG. The dither motor is identical to that utilized for dithering the RLG, comprising four struts 13a–13d equiangularly positioned and attached to the mass 12. Three piezoelectric crystals 15a–15c are coupled to three of these struts. Alternating current electrical signals coupled to the three piezoelectric crystals 15a–15c generate pressures, that vary with the amplitude of the signals, causing the entire assembly to vibrate. A fourth piezoelectric crystal 15d is coupled to the fourth strut and acts as a vibration pick-off, sensing the vibrations of the dither motor and converting these to electrical signals.

Figure 2:
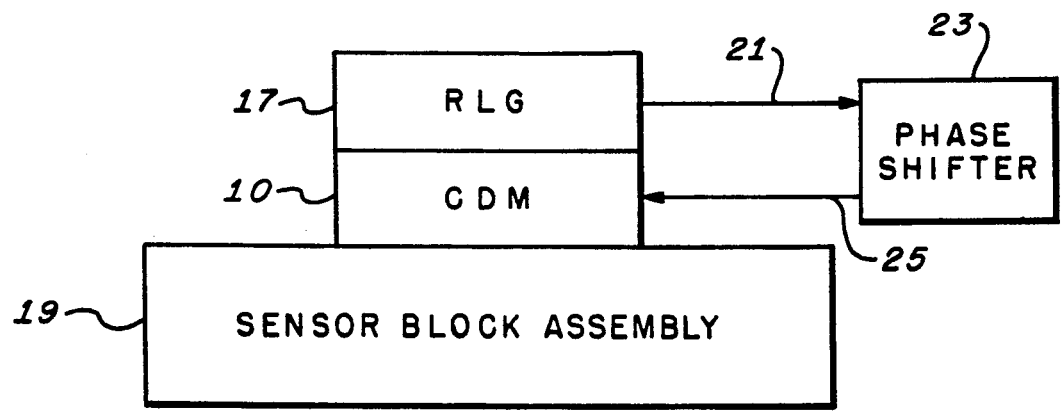
FIG. 2 is a block diagram of an embodiment of the invention wherein a signal at a frequency representative of the gyroscope dithering cycle is phase shifted and thereafter utilized to drive a counter dither mass.

Referring now to FIG. 2, the counter dithering mass assembly 10 is coupled between RLG 17 and SBA 19. In FIGS. 1-6 like elements bear the same numerical designations. The electrical signal provided by the pick-off crystal of the RLG dither motor is coupled via line 21 to a phase shifter 23 and therefrom via line 25 to the drive crystals of the CDM. Phase shifter 23 may be designed to provide 180° phase shift between the pick-off signal from the RLG 17 dither motor and the electrical signals provided to the drive crystals of the dither motor for the CDM 10. This 180° phase shift causes the dither motor of the CDM 10 to vibrate the CDM 10 180° out-of-phase with the dithering of the RLG 17, thereby providing a dynamic vibration absorber by establishing vibrations in the SBA 19 that counter the vibrations caused by the dithering of the RLG 17.

Vibrations induced in the SBA 19 by the dithering of RLG 17 and the CDM 10 may not be in-phase with the driving forces. Additionally, physical variations, such as differences in moments of inertia and coupling coefficients between the RLG 17 and the CDM 10 to the SBA 19, may establish phase shift and amplitude differentials between the vibrations induced by the RLG 19 and the CDM 10. Consequently, a simple 180° phase shift between the dithering frequency of the RLG 17 and the CDM 10 may not provide the optimum vibration cancellation. Greater vibration cancellation of the SBA over that provided by the simple 180° phase shift may be provided via a closed loop control system wherein the SBA assembly 19 vibrations are converted to electrical signals, which are then processed to drive the dither motor of the CDM 10 with the proper phase and amplitude relative to the dither signal driving the RLG 17. A block diagram of such a system is shown in FIG. 3.

An accelerometer 27, mounted on the SBA 19, senses the vibrations and provides a signal having a frequency and amplitude that is representative of the frequency and amplitude of the SBA 19 vibration frequency and amplitude. This electrical signal, the pick-off signal from the dither motor driving the RLG 17, and the pick-off signal from the dither motor driving the CDM are coupled to a control electronic circuit 29, yet to be described, wherein the signals are processed to provide a driving signal, via line 31 to the dither motor of the CDM that establishes a null at the output of the accelerometer 27.

Figure 3:
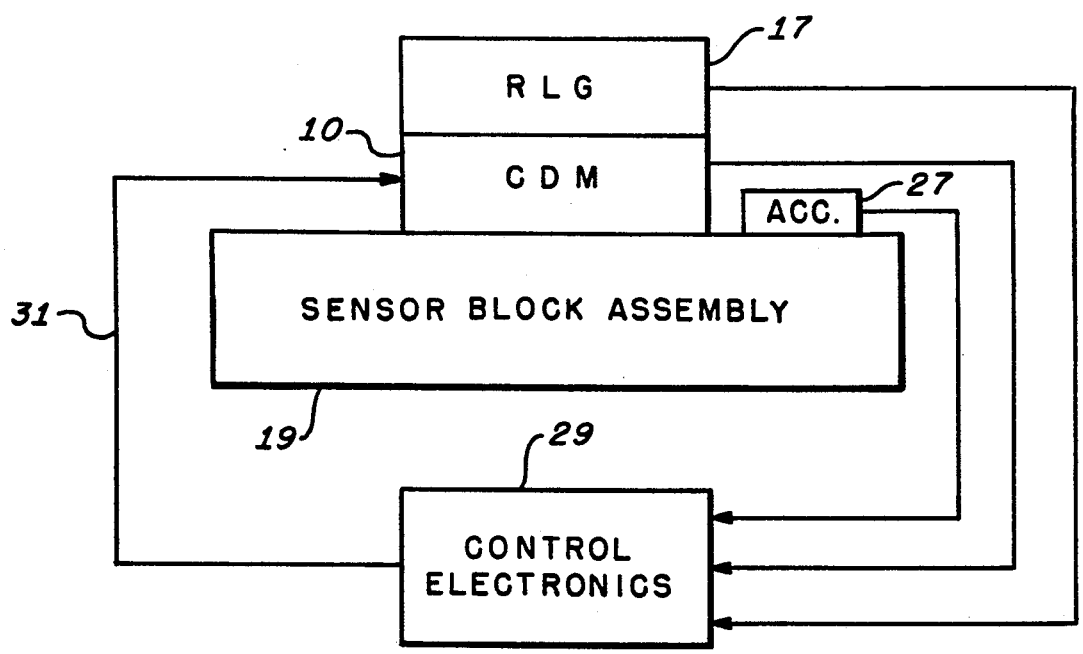
FIG. 3 is a block diagram of an embodiment of the invention wherein signals representative of the sensor block assembly vibrations and signals representative of the dithering of the gyroscope and counter dither mass are coupled to control electronic circuitry therefrom a signal is provided to drive the counter dither mass.

In FIGS. 2 and 3, the CDM 10 is shown mounted on the SBA 19 with the RLG 17 mounted on the CDM 10. It should be apparent that other mounting configurations are possible that may provide the desired vibration cancellation. In FIG. 4, the CDM 10 is shown mounted in a recess of the SBA. The pick-off from the CDM 10 is coupled to a terminal 33 mounted on the SBA wherefrom pick-off signals are coupled to the control electronics 29, while the dither motor drive terminals of CDM 10 are coupled to a second terminal 35 mounted on the SBA 19 that is coupled to the control electronics 29 via the line 31. In FIG. 5, the RLG 17 is shown mounted on a surface of the SBA 19 while the CDM 10 is mounted on an opposite surface. In this configuration, the electrical signals are coupled to and from the control electronics 29 in the same manner as that shown in FIG. 3.

Figure 6:
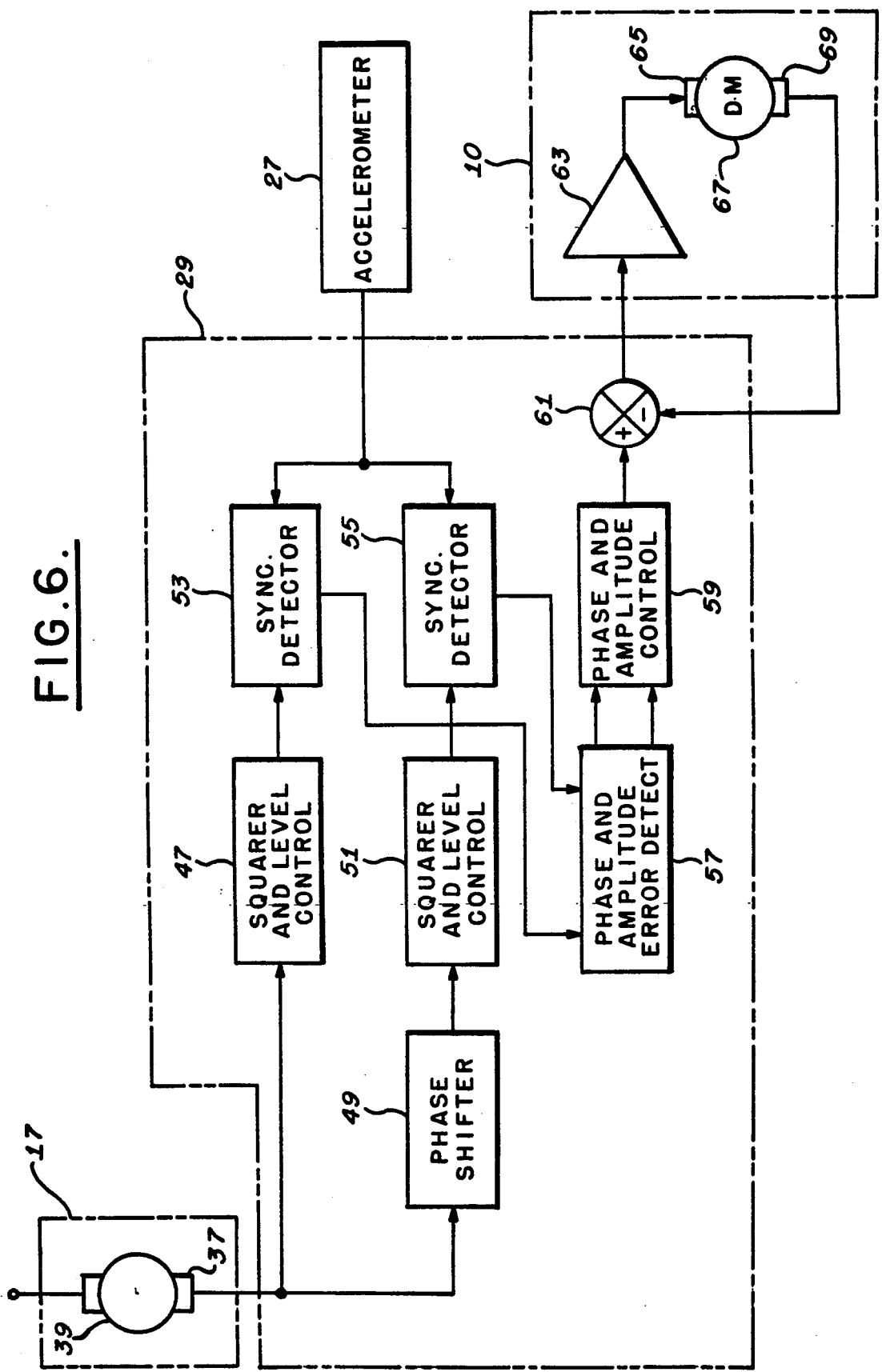
FIG. 6 is a block diagram of a circuit that may be utilized for the control electronics shown in FIGS. 3-5.

A block diagram of a circuit which may be employed for the control electronics 29 is shown in FIG. 6. The signal at the pick-off 37 of the RLG dither motor 39 is applied to a wave squarer and level control circuit 47 and via a 90° phase shifter 49 to a second squarer and level control circuit 51. The signals at the output terminals of the squarer and level control circuits 47 and 51 are respectively in-phase and in quadrature with the signal at the output terminals of pick-off 37. These in-phase and quadrature signals are coupled to synchronous detectors 53 and 55 as reference signals for the detection of the accelerometer 27 output signals. Signals at the output terminals of the synchronous detectors 53 and 55 are functions of the phase and the amplitude of the SBA 19 vibrations relative to the phase and amplitude of the signal at pick-off 37. When the phase angle is small, the output signal from the synchronous detector 53 is representative of the amplitude of the vibrations, while the output signal from the synchronous detector 55 is representative of the phase angle. In-phase and quadrature detected signals from synchronous detectors 53 and 55 are coupled to a phase and amplitude error detector 57 wherefrom signals representative of the vibration phase and amplitude are coupled to a phase and amplitude control circuit 59 which provides a reference signal having a phase and amplitude that is determined by the phase and amplitude errors detected by the phase and amplitude error detector 57. This reference signal is coupled to a non-inverting terminal of summation network 61, the output terminal of which is coupled via an amplifier 63 to the input drive terminal 65 of the dither motor 67. A signal at the pick-off terminal 69 of the dither drive motor 67, which is representative of the CDM dither amplitude and frequency, is coupled to an inverting terminal of the summation network 61. This arrangement adjusts the amplitude and frequency of the dither motor 67 drive signal to establish a dithering of the CDM 10 that induces vibrations in the SBA 19 which optimally counter the vibrations induced thereon by the RLG 17.

While the invention has been described in its preferred embodiments, it is to be understood that the words which have been used are words of description rather than limitation and that changes may be made within the purview of the appended claims without departing from the true scope and spirit of the invention in its broader aspects.

We claim:

1. An apparatus for countering vibrations of a platform induced by a mechanically oscillating mass mounted on the platform and driven by a motor comprising:

motor pick-off means at said motor for providing electrical signals representative of said oscillating mass movements;

a counter mass mechanically coupled to said platform;

oscillator means for mechanically oscillating said counter mass, oscillator pick-off means at said oscillator means for providing signals representative of mechanical movements of said counter mass;

drive input means at said oscillator means for receiving electrical signals to mechanically drive said counter mass;

accelerometer means mounted on said platform for providing electrical signals representative of platform vibrations; and vibration control means coupled to receive signals from said motor pick-off means, signals from said oscillator pick-off means, and signals from said accelerometer means for providing signals to said drive input means that cause said oscillator means to mechanically drive said counter mass in a manner to induce vibrations of said platform that counter vibrations of said platform induced by oscillations of said oscillating mass.

2. An apparatus in accordance with claim 1 wherein said counter mass is constructed to have a mechanical resonant frequency equal to that of said oscillating mass.

3. An apparatus in accordance with claim 1 wherein said vibration control means comprises:

means coupled to said motor pick-off means for providing a first reference signal in-phase with a signal at said motor pick-off means;

means coupled to said motor pick-off means for providing a second reference signal phase shifted by a predetermined phase angle relative to said signal at said motor pick-off means; and means coupled to receive said first and second reference signals and signals from said accelerometer means for providing drive signals to said drive input means to mechanically oscillate said counter mass in a manner to induce vibrations in said platform that counter said vibrations induced in said platform by oscillations of said oscillating mass.

4. An apparatus in accordance with claim 3 wherein said drive signal means includes:

means for detecting said electrical signals from said accelerometer means relative to said first and second reference signals to provide amplitude and phase error signals;

means coupled to receive said phase and amplitude error signals for providing drive reference signals in accordance with said phase and amplitude error signals; and means coupled to receive and compose said reference drive signals and signals from said oscillator pick-off of said oscillator means to said drive input means.

5. An apparatus in accordance with claim 3 wherein said counter mass is mounted between said oscillating mass and said platform.

6. An apparatus in accordance with claim 3 wherein said mass means is mounted in a recess of said platform.

7. An apparatus in accordance with claim 3 wherein said oscillating mass is mounted on a first surface of said platform and said counter mass is mounted on a second surface of said platform that is opposite said first surface.

8. A method for countering vibrations of a platform induced by motions of a mechanically oscillating mass mounted thereon comprising the steps of:

mounting a counter mass on said platform;

generating a first reference signal in-phase with a signal representative of said motions of said mechanically oscillating mass;

generating a second reference signal phase shifted by a predetermined phase angle relative to said motions representative signal;

providing a signal representative of vibrations of said platform;

synchronously detecting said vibrations representative signal relative to said first and second reference signals to obtain phase and amplitude error signals;

processing said phase and amplitude error signals to generate a drive reference signal; and coupling said drive reference signal to motor means coupled to said counter mass for oscillating said counter mass in a manner to induce vibrations of said platform that counter vibrations thereof induced by said oscillating mass.

* * * * *